US006405058B2

(12) United States Patent
Bobier

(10) Patent No.: US 6,405,058 B2
(45) Date of Patent: Jun. 11, 2002

(54) WIRELESS HIGH-SPEED INTERNET ACCESS SYSTEM ALLOWING MULTIPLE RADIO BASE STATIONS IN CLOSE CONFINEMENT

(75) Inventor: Joseph Bobier, Sarasota, FL (US)

(73) Assignee: iDigi Labs, LLC, Sarasota, FL (US)

( * ) Notice: Subject to any disclaimer, the term of this patent is extended or adjusted under 35 U.S.C. 154(b) by 5 days.

(21) Appl. No.: 09/742,526

(22) Filed: Dec. 20, 2000

Related U.S. Application Data

(60) Provisional application No. 60/204,401, filed on May 16, 2000.

(51) Int. Cl.[7] .................................................. H04B 1/38

(52) U.S. Cl. ....................... 455/562; 455/103; 455/117; 455/128; 455/129; 343/840

(58) Field of Search ................................. 455/561, 562, 455/550, 575, 90, 103, 117, 128, 129; 343/756, 840, 772, 780, 775, 779, 837, 912

(56) References Cited

U.S. PATENT DOCUMENTS

| | | | | | |
|---|---|---|---|---|---|
| 4,607,260 | A | * | 8/1986 | Dragone | 343/786 |
| 4,876,554 | A | | 10/1989 | Tubbs | |
| 5,854,986 | A | * | 12/1998 | Dorren et al. | 455/562 |
| 5,995,057 | A | * | 11/1999 | Faith et al. | 343/781 R |
| 6,041,219 | A | * | 5/2000 | Peterson | 455/128 |
| 6,275,196 | B1 | * | 8/2001 | Bobier | 343/840 |
| 6,278,409 | B1 | * | 8/2001 | Zuta | 343/756 |

FOREIGN PATENT DOCUMENTS

| | | | | |
|---|---|---|---|---|
| EP | 0 844 813 A2 | | 5/1998 | |
| EP | 0844813 | * | 5/1998 | H05K/9/00 |

* cited by examiner

*Primary Examiner*—Edward F. Urban
*Assistant Examiner*—Tilahun Gesesse
(74) *Attorney, Agent, or Firm*—Dennis L. Cook, Esq.; Fowler White Boggs Banker, P.A.

(57) ABSTRACT

An improvement in the design and deployment of collocated radio transceivers for high-speed wireless Internet access accomplished by increased isolation brought about by wrapping each transceiver in a shield of mild steel, enclosing collocated transceivers and associated equipment in non-reflective enclosures, use of low loss RF coaxial cables, and use of high isolation parabolic horn antennas.

5 Claims, 4 Drawing Sheets

WIRELESS HIGH-SPEED INTERNET ACCESS SYSTEM ALLOWING MULTIPLE RADIO BASE STATIONS IN CLOSE CONFINEMENT

CROSS-REFERENCE TO RELATED APPLICATION

The present application claims the benefit of previously filed co-pending Provisional Patent Application, Ser. No. 60/204,401 filed May 16, 2000.

FIELD OF THE INVENTION

This invention relates, generally, to an improvement in radio system construction and deployment that allows for a higher concentration of radio transceivers to be collocated and more specifically to an Internet access system including a high isolation parabolic horn antenna and other isolation techniques to allow for a high concentration of transceivers at one location thus improving data rates and significantly lowering the cost of deployment of a wireless Internet access system.

BACKGROUND OF THE INVENTION

As the communications industry continues to evolve, ever-increasing demand for high-speed broadband solutions for communications will result, with the accompanying technologies experiencing a similar demand pattern. While industry analysts predict that 100-megabit speeds will be common by the year 2002, the disclosed system design can assist in delivering these speeds now.

The need for high-speed Internet access within the U.S. is well defined. With respect to Internet applications alone, as of Dec. 1999, there were fewer than 250,000 U.S. customers purchasing DSL services, as compared to more than 30 million Internet customers. The ever increasing need for wireless communication services such as Cellular Mobile Telephone (CMT), Digital Cellular Network (DCN), Personal Communication Services (PCS) and the like, typically requires the operators of such systems to serve an ever increasing number of users in a given service area. As a result, certain types of base station equipment including high capacity Broadband Transceiver Systems (BTS) have been developed which are intended to service a relatively large number of active mobile stations in each cell. Such broadband transceiver system equipment can typically service, for example, ninety-six simultaneously active mobile stations in a single four-foot tall rack of electronic equipment. This base station equipment typically costs less than $2000 to $4000 per channel to deploy, and so the cost per channel serviced is relationally low. But, demand is increasing beyond capacity and downward cost pressures continue to exist.

Numerous patents have attempted to solve these problem such as U.S. Pat. No. 5,970,410 issued to Carney, et al. on Oct. 19, 1999 titled Cellular System Plan Using In Band-Translators To Enable Efficient Deployment Of High Capacity Base Transceiver Systems. This patent describes a wireless system architecture whereby high efficiency broadband transceiver systems can be deployed at an initial build out stage of the system in a cost-efficient manner. A home base station location is identified within each cluster of cells and rather than deploy a complete suite of base station equipment at each of the cells in the cluster, inexpensive translator units are located in the outlying cells serviced by the home base station in which low traffic density is expected. The translators are connected to directional antennas arranged to point back to the home base station site. The translators are deployed in such a way which meshes with the eventually intended frequency reuse for the entire cluster of cells. The translator to base station radio links operate in-band, that is, within the frequencies assigned to the service provider. For example, the available frequency bands are divided into at least two sub-bands, with a first sub-band is assigned for use as a home base station to translator base station communication link and a second sub band is assigned for use by the mobile station to translator communication link. If desired, a third sub-band can then be used for deployment of base transceiver systems in the conventional fashion where the base station equipment located at the center of a cell site communicates only with mobile stations located within that cell. When coupled with efficient frequency reuse schemes maximum efficiency in densely populated urban environments is obtained. According to some arrangements the cells are each split into radial sectors and frequencies are assigned to the sectors in such a manner as to provide the ability to reuse available frequencies. Although frequency reuse schemes can be highly efficient, it requires at least two complete sets of multi-channel transceiver equipment such as in the form of a Broadband Transceiver System (BTS) to be located in each cell.

However, when a wireless system first comes on line, demand for use in most of the cells is relatively low, and it is typically not possible to justify the cost of deploying complex multichannel broadband transceiver system equipment based only upon the initial number of subscribers. Because only a few cells at high expected traffic demand locations (such as at a freeway intersection) will justify the expense to build-out with high capacity Broadband Transceiver System equipment, the service provider is faced with a dilemma. He can buildout the system with less expensive narrowband equipment initially, to provide some level of coverage, and then upgrade to the more efficient equipment as the number of subscribers rapidly increases in the service area. However, the initial investment in narrowband equipment is then lost. Alternatively, a larger up front investment can be made to initially deploy high capacity equipment, so that once demand increases, the users of the system can be accommodated without receiving busy signals and the like. But this has the disadvantage of carrying the money cost of a larger up front investment.

Other various techniques for extending the service area of a given cell have been proposed. For example, U.S. Pat. No. 4,727,490 issued to Kawano et al. and assigned to Mitsubishi Denki Kabushiki Kaisha, discloses a mobile telephone system in which a number of repeater stations are installed at the boundary points of hexagonally shaped cells. The repeaters define a small or minor array that is, in effect, superimposed on a major array of conventional base stations installed at the center of the cells. With this arrangement, any signals received in so-called minor service areas by the repeaters are relayed to the nearest base station.

Another technique was disclosed in U.S. Pat. No. 5,152,002 issued to Leslie et al., wherein the coverage of a cell is extended by including a number of so-called "boosters" arranged in a serial chain. As a mobile station moves along an elongated area of coverage, it is automatically picked up by an approaching booster and dropped by a receding booster. These boosters, or translators, use highly directive antennas to communicate with one another and thus ultimately via the serial chain with the controlling central site. The boosters may either be used in the mode where the boosted signal is transmitted at the same frequency as it is received or in a mode where the incoming signal is retransmitted at a different translated frequency.

Additional attempts to improve coverage include spectral efficiency schemes such as disclosed in U.S. Pat. 5,592,490 issued to Barratt, et al., on Jan. 7, 1997 titled Spectrally Efficient High Capacity Wireless Communication Systems which discloses a wireless system comprising a network of base stations for receiving uplink signals transmitted from a plurality of remote terminals and for transmitting downlink signals to the plurality of remote terminals using a plurality of conventional channels including a plurality of antenna elements at each base station for receiving uplink signals, a plurality of antenna elements at each base station for transmitting downlink signals, a signal processor at each base station connected to the receiving antenna elements and to the transmitting antenna elements for determining spatial signatures and multiplexing and demultiplexing functions for each remote terminal antenna for each conventional channel, and a multiple base station network controller for optimizing network performance, whereby communication between the base stations and a plurality of remote terminals in each of the conventional channels can occur simultaneously.

Other methods include specialized propagation techniques such as shown in U.S. Pat. No. 6,058,105 issued to Hochwald, et al. on May 2, 2000 titled Multiple Antenna Communication System And Method Thereof which discloses a communications system that achieves high bit rates over an actual communications channel between M transmitter antennas of a first unit and N receiver antennas of a second unit, where M or N>1, by creating virtual sub-channels from the actual communications channel. The multiple antenna system creates the virtual sub-channels from the actual communications channel by using propagation information characterizing the actual communications channel at the first and second units. For transmissions from the first unit to the second unit, the first unit sends a virtual transmitted signal over at least a subset of the virtual sub-channels using at least a portion of the propagation information. The second unit retrieves a corresponding virtual received signal from the same set of virtual sub-channels using at least another portion of said propagation information.

Unfortunately, each of these techniques has their difficulties and adds additional costs and complexities to the system. With the method, which uses an array of repeaters colocated with the primary cell sites, the implementation of diversity receivers becomes a problem. Specifically, certain types of cellular communication systems, particularly those that use digital forms of modulation, are susceptible to multi-path fading and other distortion. It is imperative in such systems to deploy diversity antennas at each cell site. This repeater array scheme makes implementation of diversity antennas extremely difficult, since each repeater simply forwards its received signal to the base station, and diversity information as represented by the phase of the signal received at the repeater, is thus lost.

The booster scheme works fine in a situation where the boosters are intended to be laid in a straight line along a highway, a tunnel, a narrow depression in the terrain such as a ravine or adjacent a riverbed. However, there is no teaching of how to efficiently deploy the boosters in a two-dimensional grid, or to share the available translated frequencies as must be done if the advantages of cell site extension are to be obtained throughout an entire service region, such as a large city.

Therefore a need exists for a wireless communications system which achieves high bit rates in a cost effective and relatively simple manner.

It is therefore clear that a primary object of this invention is to advance the art of high-speed wireless Internet access system design. A more specific object is to advance said art by providing an improved efficiency antenna and radio deployment system useful for high-speed wireless Internet access.

These and other important objects, features, and advantages of the invention will become apparent as this description proceeds. The invention accordingly comprises the features of construction, combination of elements and arrangement of parts that will be exemplified in the construction hereinafter set forth, and the scope of the invention will be indicated in the claims.

SUMMARY OF THE INVENTION

What is disclosed is an improvement in the design and deployment of collocated radio transceivers for high-speed wireless Internet access accomplished by increased isolation brought about by wrapping each transceiver in a shield of mild steel, enclosing collocated transceivers and associated equipment in non-reflective enclosures, use of low loss RF coaxial cables, and use of high isolation parabolic horn antennas.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

The present invention will now be described more fully, hereinafter, with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A type of radio technology known as Spread Spectrum Frequency Hopping, "SSFH" has recently become popular in the industry to deliver wireless Internet access. Frequencies set aside by the FCC and ETSI, known as ISM (Industrial Scientific and Medical) in the 2.4 GHz and 900 MHz bands, has become the de facto standard for such services. These services operate under FCC part 15, unlicensed use, and as such must exist with certain technological hobbles imposed by the governing bodies. Among these limitations are power limitations and uncoordinated frequency hopping.

The radio equipment of this invention is designed to share a radio band, typically in the 2.4 GHz to 2.483 GHz frequency band. Since operation is unlicensed, usual governmental frequency usage coordination is impossible. To facilitate free and fair sharing of the available frequencies, Government rules require that the radio transmitters must change frequency of operation on a regular basis, typically within 40 to 400 milliseconds per hop. In addition, the radio frequency hopping pattern must be in a pseudo random pattern. This random hopping pattern then precludes the domination of a given radio frequency by any single radio transmitter. In theory, many users of the frequencies would therefore share the band, with little mutual interference.

In the case of many users transmitting from different locations, the system works well because the power limits imposed by the governing body and the inability of such high frequencies, especially in the 2.4 GHz band, to penetrate structures and dense foliage will naturally isolate the systems. Thus, the original government analysis and intention is supported. However, if one wishes to aggregate many transmitters into a single location for the purpose of providing data services to high concentrations of end users, a self-interference issue quickly arises.

Figure 3:
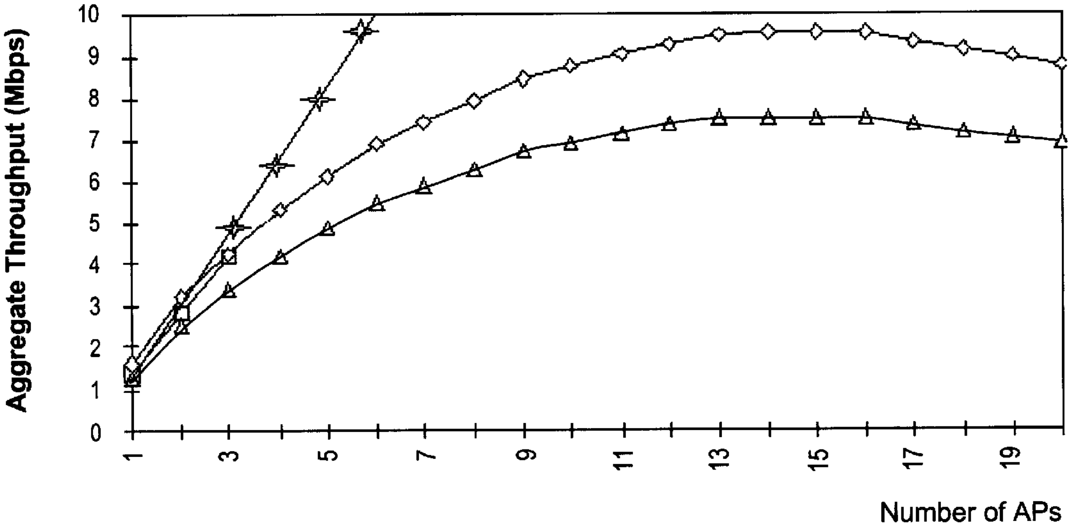
FIG. 3 is a diagram showing aggregate throughput of collocated systems.

Depending upon the type of radio equipment used, one will see severe interference with as few as 4 to 7 radios and interference is detectable upon addition of just the second radio. At the level of 15 radios, one has reached the absolute point of diminishing returns. Adding more radios will become detrimental and will result in an actual reduction of data throughput. FIG. 3 shows the degradation in throughput speed as the number of collocated radio transceivers is increased for three different transmission systems (triangle line=FHSS industry standard 802.11; diamond line=3 Mbps spread spectrum proprietary system; square line=spread spectrum direct sequence where there are only 3 access points in a system) as compared with the starred straight line which represents a system such as the one disclosed in this invention resulting in complete isolation. This starred line was actually calculated using the 3 Mbps spread spectrum system improved by using the techniques of this invention, but the results would be the same on any of the tested systems using the techniques disclosed herein.

A system has thus been designed as shown by this disclosure which, when used in combination, will mitigate the effect of the radio self-interference, allowing a dramatic increase of data throughput at radio collocations of fewer than 15 devices, and will in effect allow collocation of even substantially more than 15 radios.

Figure 1:
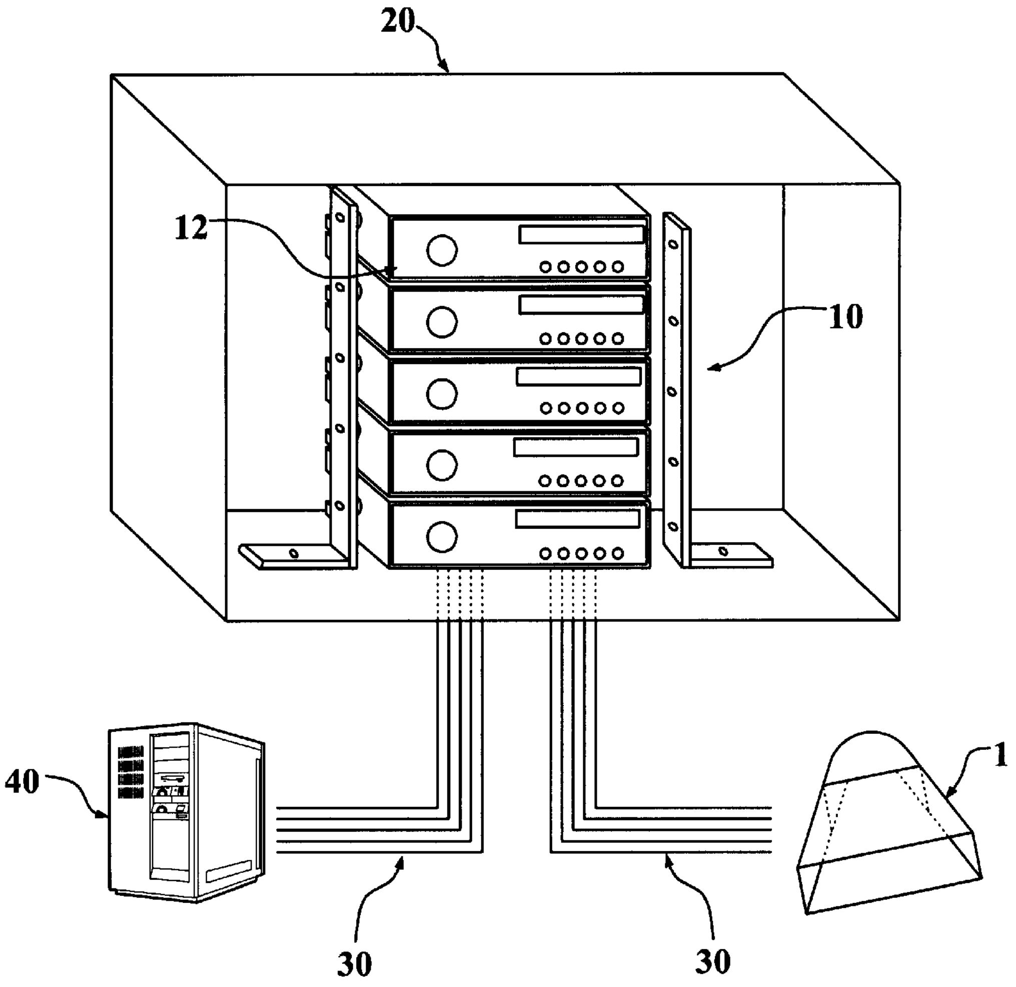
FIG. 1 is the first diagram showing the wireless cell layout of the preferred embodiment.

The overall concept is to isolate the radio transceivers, one from another, so that they cannot detect the signal from all or some of the other transceivers located within the same system. This is accomplished using four techniques and mechanical devices, which work together to achieve the overall degree of isolation required. This concept is shown in FIG. 1 where the Improved Wireless High-Speed Internet Access System is disclosed. A non-reflective enclosure (20) then encloses the shielded collocated radio transceivers (10) and other equipment (not shown). Low loss coaxial cables (30) are used to feed signals and transmit signals from a source (40) to the radio transceivers (12), and to connect the radio transceivers (12) to the parabolic horn antennas (1), the last element of the system.

Figure 4:
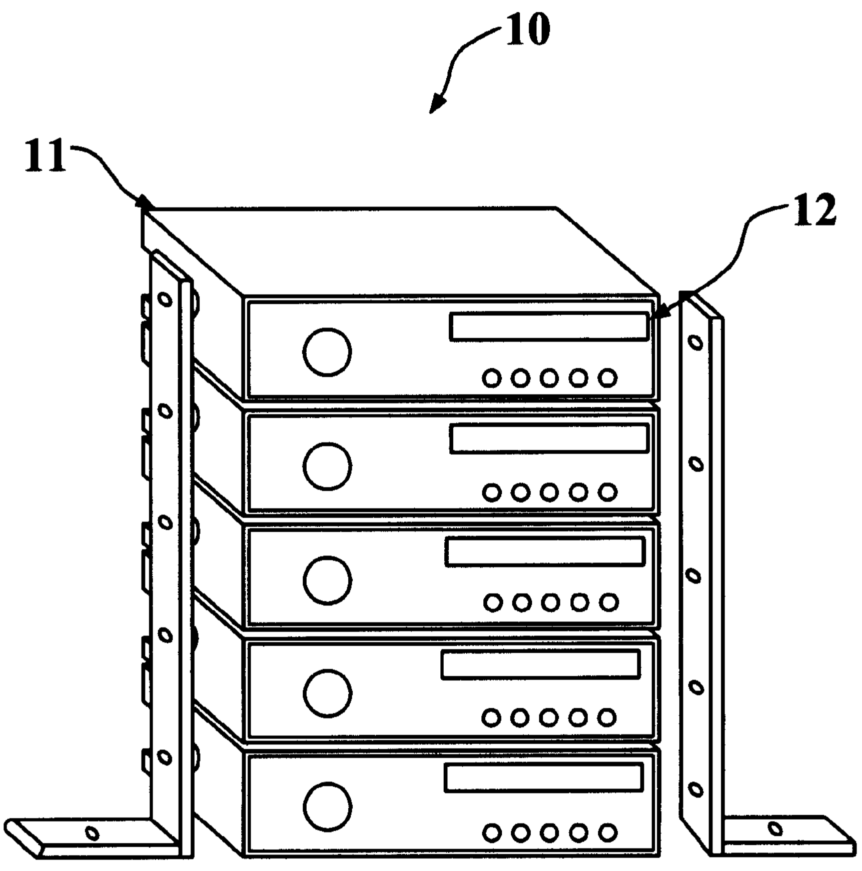
FIG. 4 is a mechanical view of the shielding used on the system.

The first element of the system is transceiver shielding as shown in FIG. 4. All radio transceivers "leak" radio energy from their enclosures. Other radio transceivers, located in very close proximity and operating on the same or a nearby radio frequency, will become exposed to the leaked RF energy. The exposure will either cause direct interference, or receiver de-sensitization (de-sense). Either effect is destructive and can cause weaker legitimate radio signals to become lost.

This invention combats this effect at the transceiver by providing physical isolation shielding around each transceiver. In practice, this is done by "wrapping" each transceiver in a shield of mild steel that is then grounded. As shown in FIG. 4, the system consists of a stacked shelve (11), made of mild steel and physically wrapped around each radio transceiver (12), which then attach to other similar stacked shelves (11), in a stacked manner, to create the collocated radio transceivers (10). In the preferred embodiment the radio transceivers (12) are placed in direct contact, stacked directly one atop another, and thus become separated by two layers of steel shielding, one layer for each stacked shelf (11). This increases the radio transceiver density per enclosure without any inter-unit leakage. Typical leakage reduction is on the order of 20 db in the preferred embodiment disclosed in this description.

In the prior art the radio equipment is usually mounted inside a weatherproof cabinet or enclosure as a self contained system. The enclosure is then mounted upon a radio tower or other structure, near the antenna location(s). The enclosure will house the radios, network devices; power supplies, cooling systems, heating systems, amplifiers, lightning protection devices and other essential components of the system.

As previously explained, the radio transceivers will leak RF energy. If the radios are housed inside a metallic, radio wave reflective enclosure, as is the case in the prior art, the RF will simply reflect inside the enclosure until it is dissipated. This increases the signal strength of unwanted energy inside the enclosure, increasing the signal noise floor to which the radio transceivers (12) are exposed.

In the preferred embodiment of the present system a non-reflective enclosure (20) is used, normally a fiberglass enclosure, which is transparent to RF energy. Any leaked RF will simply radiate away without substantial effect.

Also, there are many types and styles of RF coaxial cables that are used in the prior art. It might seem a simple matter, but choosing RF cables which radiate little extraneous signal becomes most important when many like radio transceivers (12) are operating and the associated antenna feed cables are bundled together into a neat installation. Leakage from one cable that is transmitting to another cable that is receiving can account for enough interference to block reception of a weak end-user. Therefore, low leakage Radio Frequency (RF) coaxial cables (30) are essential in achieving the high density system of this invention. LMR 400 and LMR 600 cables are examples of low leakage RF coaxial cables (30) used in the preferred embodiment of this invention.

Finally, antennas are designed to radiate and receive RF energy. Consider a cell installation with several transceivers and the antennas located near to each other. If energy is radiated from one antenna and a second transceiver's antenna is able to intercept some of the energy, there will be interference to whichever unit is in the receive mode. In fact, when one transceiver happens to be in the transmit mode and one or any number of other transceivers are in the receive mode, the receiving units will likely be rendered inoperative for the duration of the transmit cycle. The transmitted signal will harm the receiving unit's ability to receive through two potential mechanisms.

a. De-sense: The saturation of a radio receiver by overwhelming the receiver amplifier with RF energy on a nearby frequency.

b. Direct interference: The result of reception of two radio signals, on the same radio frequency transmitted from two sources, generally one intended and the other unintended. If one signal is 10 db greater than the other, it will tend to capture the receiver, otherwise heterodyning will occur rendering communication ineffective.

Through proper antenna selection this invention reduces or eliminates the coupling of RF energy from one antenna to an adjacent antenna. This is primarily a function of antenna design. Antennas used in the prior art with simply a high front to back ratio might be acceptable if only a few antennas are in use, and they are placed back to back. In situations where a large number of antennas are required due to a large number of transceivers, antennas with high degrees of RF rejection on all sides except the front are required.

Figure 5:
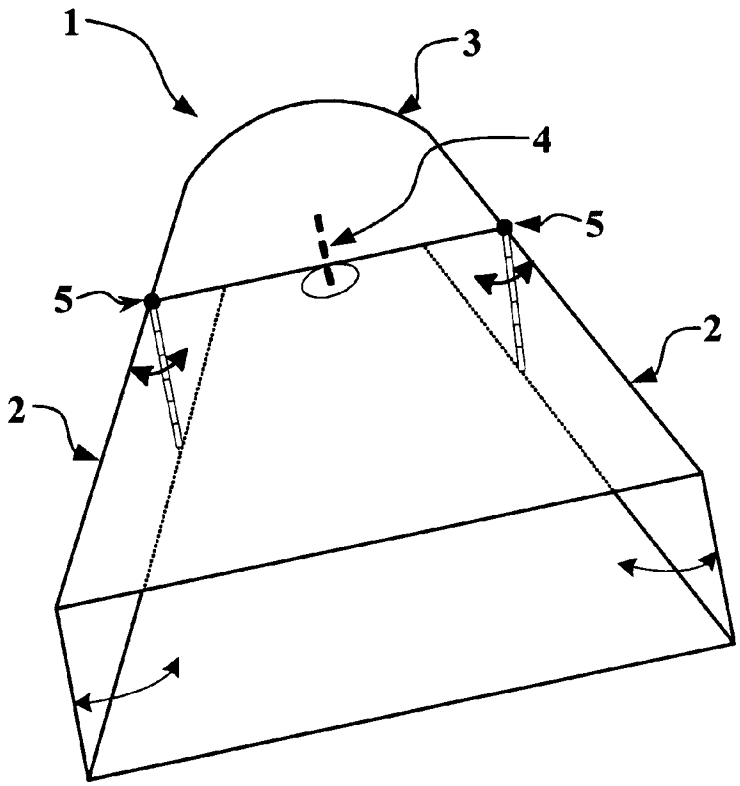
FIG. 5 is a perspective view of the parabolic horn antenna.

A good example of this type of antenna is the parabolic horn shown more clearly in FIG. 5. The parabolic horn antenna (1) of this invention is generally cone shaped, being solid reflector on all sides except the front. The rear reflecting portion (3) of the antenna is a true parabola with the probe (4) located at the focal point of the parabola. Antennas made of solid steel will provide better shielding than other materials like aluminum or magnesium, thus, in the preferred embodiment, the parabolic horn antenna (1) is made of steel. Lower density installations can use other antennas with less peripheral shielding, especially when antenna placement geometry is used to minimize antenna-to-antenna coupling. Antennas can be placed within 3 feet of each other when using high isolation feed-horn types. Using more traditional directional antennas would require special spacing consideration to account for high near-field effect, side lobe radiation strength and shape, and reflector leakage, all problems this invention overcomes.

In a wireless Internet access system, radio frequencies in the 2.4 GHz band are used. By virtue of the characteristics of this band the signal is considered to be "line of site", with little penetration capability. In addition, the signal strength is limited to an ERP of 4 Watts so it is most important to put the signal where the users are.

A design aspect of any effective high-speed wireless Internet access system is use of a Spread Spectrum Frequency Hopping radio system. (SSFH). In systems using SSFH, the radio changes frequency up to several times per second in a pseudo random fashion comprising up to 79 available radio channels. Each cell vector, consisting generally of one antenna, uses one single radio or base station. When several base stations (AP's) are colocated and each is "hopping" in its own random pattern, one can imagine occasions upon which two radios would happen to use the same frequency at the same time. As more and more base stations are added to the same cell, the statistical probability of same frequencies at the same time increase and frequency collisions create a point of diminishing returns, that is where adding more radios will add little system throughput or may actually diminish system throughput. This effect is shown more clearly in FIG. 3. In actual installations, the point of negative benefit is at the $15^{th}$ radio to be co-located. The parabolic horn antenna (1) of this invention reduces the RF collisions by isolating the radio signals from one another.

In the high-density installation that benefits from this invention, each directional antenna will be assigned a vector in which to operate. Vectors are then assigned, based upon the antenna horizontal beam width and the number of antennas to be used. A spoke pattern will result with each antenna unable to affect the other. When even more density is required, another tier of antennas, comprising a pattern of vectors can be placed upon the same vertical mounting structure as the first array. When high isolation antennas are used, vertical spacing may be as little as three feet. Up to 15 tiers can be used with as many as 12, but typically 6, antennas each.

Figure 2:
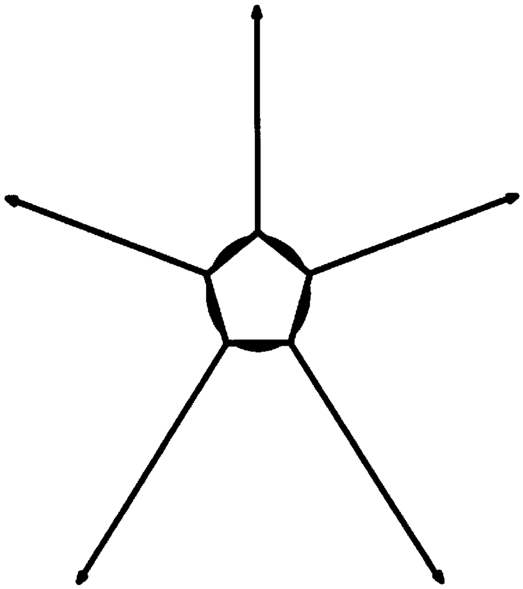
FIG. 2 is the second diagram showing wireless cell layout vectors.

In the depicted cell of FIG. 2 there are 5 directions, or vectors, which the antennas are directed towards. For 360-degree coverage then, each antenna should have a 72-degree beam width. The parabolic horn antenna (1) of the preferred embodiment is adjustable, by use of hinges (5) on its side walls (2) thus allowing adjustment of the beam width to exactly 72 degrees. Any number of vectors could be used in a given antenna array, as could any number of arrays, spaced vertically on a given tower. Practical limits dictate about 12 vectors per tier.

The parabolic horn antenna (1) of this invention has an exceptional shielding effect at the side walls (2) and rear reflecting portion (3) of the parabolic horn antenna (1), which tends to isolate one vector from another. The high degree of shielding is due to three factors.

1. The parabolic horn antenna (1) is made of solid mild steel, with no grid work or other holes.

2. The physical dimensions of the parabolic horn antenna (1) form a resonant cavity.

3. The rear reflecting portion (3) is shaped in a parabolic form, thus effecting maximum efficiency when directing signal either into the probe (4) or directing energy out the front.

Once the vectors are isolated, the number of collocated radio transceivers (12) may be increased beyond the prior art limit of 15 as shown in FIG. 3.

Referring again to the mechanical diagram, FIG. 5, the parabolic horn antenna (1) is designed using many formulae similar to those used when designing a wave guide antenna. The notable differences are that the rear reflecting portion (3) of the parabolic horn antenna (1) is a true parabolic shape with the probe (4) located at the focal point of the parabola. Also, the side walls (2) of the parabolic horn antenna (1), in the broadest dimension, are adjustable through use of hinges (5) to allow the side walls (2) to be angled at an optimum degree, which increases the opening aperture allowing the system to capture more RF energy than a simple rectangular or tubular wave guide antenna would allow. The length, therefore the aperture width, is variable, thus providing control over the aperture size and therefore gain of the system. Finally, the radiation pattern is wider in the horizontal angle than the vertical angle, providing a more beneficial pattern when broadcasting from a high position such as a tall tower; for example broadcasting to a community on the ground from a high elevation while preventing signal from being wasted in a skyward vector.

The angled side walls (2) are designed for optimal performance. If the angle is too narrow, the effective aperture area is reduced, resulting in lost capture opportunity. If the angle is too wide, velocity factors along the metal surface of the side walls (2) cause a delay in signal propagation relative to the more direct signal path near the center of the aperture. Thus, If the angle is too wide, signal cancellation will occur between the two signals causing an electrical nulling of the energy.

Side and rear rejection of signal (front to back ratio) is excellent, on the order of 30–40 db isolation, depending on the metal used. It has been determined that mild steel construction is greatly favorable over aluminum or magnesium construction because of it's lower permeability to RF energy. This would be critical in installations where several radio devices will be co-located, and operating on potentially interfering frequencies, such as SSFH radio systems operating in an uncoordinated fashion as is required in the un-licensed ISM radio spectrum.

Energy may be introduced or extracted from the antenna by either the electric or the magnetic field. The energy transfer frequently used is through a coaxial cable. Two methods of coupling to wave guides are thus commonly used. These are loop and probe methods. The seldom used loop method involves the extension of the coaxial cable center conductor into the cavity, then looping it 180 degrees and attaching the free end to the cavity wall. This creates an interface similar to the shorted stub matching system well known to those skilled in the art and used in many antenna designs.

The probe method, more commonly used, is comprised of either a straight or bent center conductor extension, inserted into the cavity. The free end is not connected to the cavity wall. In such a case, the probe is generally ¼ wl long. If a bent probe is used, it may be rotated to adjust the degree of coupling. Coupling is maximum when the probe is cross-sectional to the magnetic lines of force. Coupling is minimum when the probe is parallel to the lines of force.

In the preferred embodiment of this invention, the probe (4) is typically formed of a straight section of metal tubing; copper, brass, silver or other conductive material may be used. The probe (4) is mounted at the focal point of the parabolic shaped rear reflecting portion (3), at a distance of ¼ wlg (wave guide length) from the surface of the rear reflecting portion (3). Within the parabolic horn antenna (1), radio energy will decelerate to some velocity lower than the free-space speed of light. The factor of deceleration will vary, depending on the RF wavelength relative to the vertical antenna dimension and the conductivity of the material used. Generally, the deceleration factor will be about 10 %, however it can vary by even more, up to 30 %. In the preferred embodiment a 10 % velocity factor is typical. The velocity factor will therefore affect the distance spacing of the probe (4) from the surface of the rear reflecting portion (3). The adjusted distance or wavelength is referred to as the wave guide length (wgl). Wgl may be calculated as wl times velocity factor. In the preferred embodiment the wgl is typically 1.1 wl.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the dependent claims.

What is claimed is:

1. An improvement in the design and deployment of collocated radio transceivers and associated equipment for high-speed wireless Internet access comprising;

shield wraps;

said shield wraps individually enclosing each of at least two radio transceivers;

said shield wraps being stackable one on top another such that said enclosed and stacked radio transceivers become collocated radio transceivers;

a non-reflective enclosure;

said non-reflective enclosure surrounding said collocated radio transceivers and associated equipment;

low loss RF coaxial cables;

said low loss RF coaxial cables being used to electrically connect said collocated radio transceivers to a source of information such that information can be transferred from said source to said collocated radio transceivers and from said collocated radio transceivers to said source;

high isolation parabolic horn antennas;

said high isolation parabolic horn antennas being generally cone shaped;

said high isolation parabolic horn antennas being solid reflector on all sides except the front;

said high isolation parabolic horn antennas having radiation patterns wider in the horizontal angle than in the vertical angle;

said high isolation parabolic horn antennas having rear reflecting portions in the shape of a true parabola with probes located at the focal point of the parabola; and, said high isolation parabolic horn antennas being electrically connected by said low loss RF cables to said collocated radio transceivers such that information transferred from said collocated radio transceivers can be transmitted from said high isolation parabolic horn antennas and information captured by said high isolation parabolic horn antennas can be transferred to said collocated radio transceivers.

2. The improvement in the design and deployment of collocated radio transceivers and equipment for high-speed wireless Internet access of claim 1 further comprising:

said shield wrap being constructed of mild steel.

3. The improvement in the design and deployment of collocated radio transceivers and equipment for high-speed wireless Internet access of claim 1 further comprising:

said non-reflecting enclosure being made of fiberglass.

4. The improvement in the design and deployment of collocated radio transceivers and equipment for high-speed wireless Internet access of claim 1 further comprising:

said high isolation parabolic horn antennas being constructed of mild steel.

5. The improvement in the design and deployment of collocated radio transceivers and equipment for high-speed wireless Internet access of claim 1 further comprising:

said high isolation parabolic horn antennas having adjustable vertical sides allowing for adjustment of horizontal beam width.

* * * * *